Sept. 9, 1941.    W. P. HUTCHINSON ET AL    2,255,219
METER HEAD INCORPORATING LOW-PRESSURE REGULATOR
Filed March 23, 1939    3 Sheets-Sheet 1
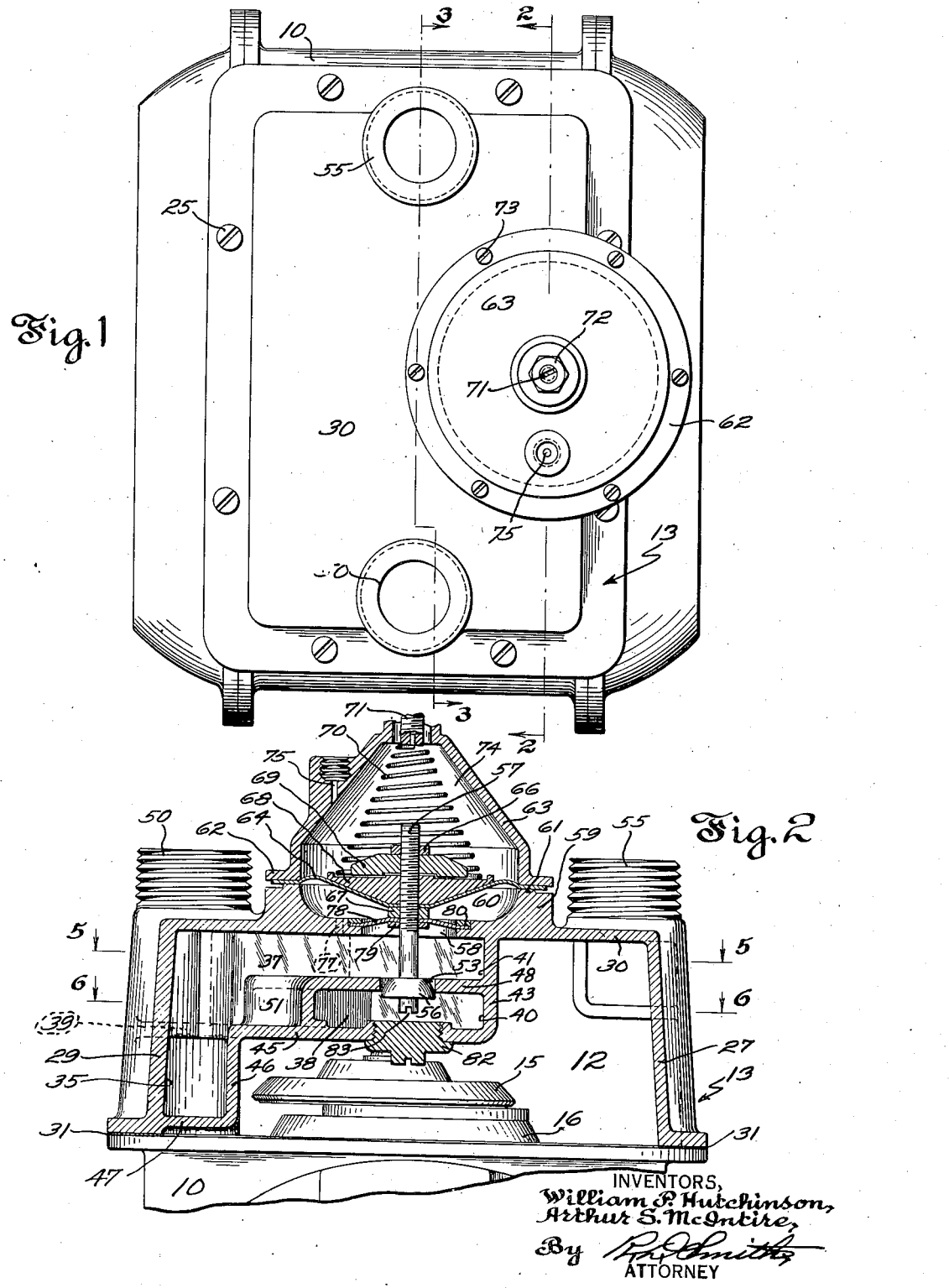

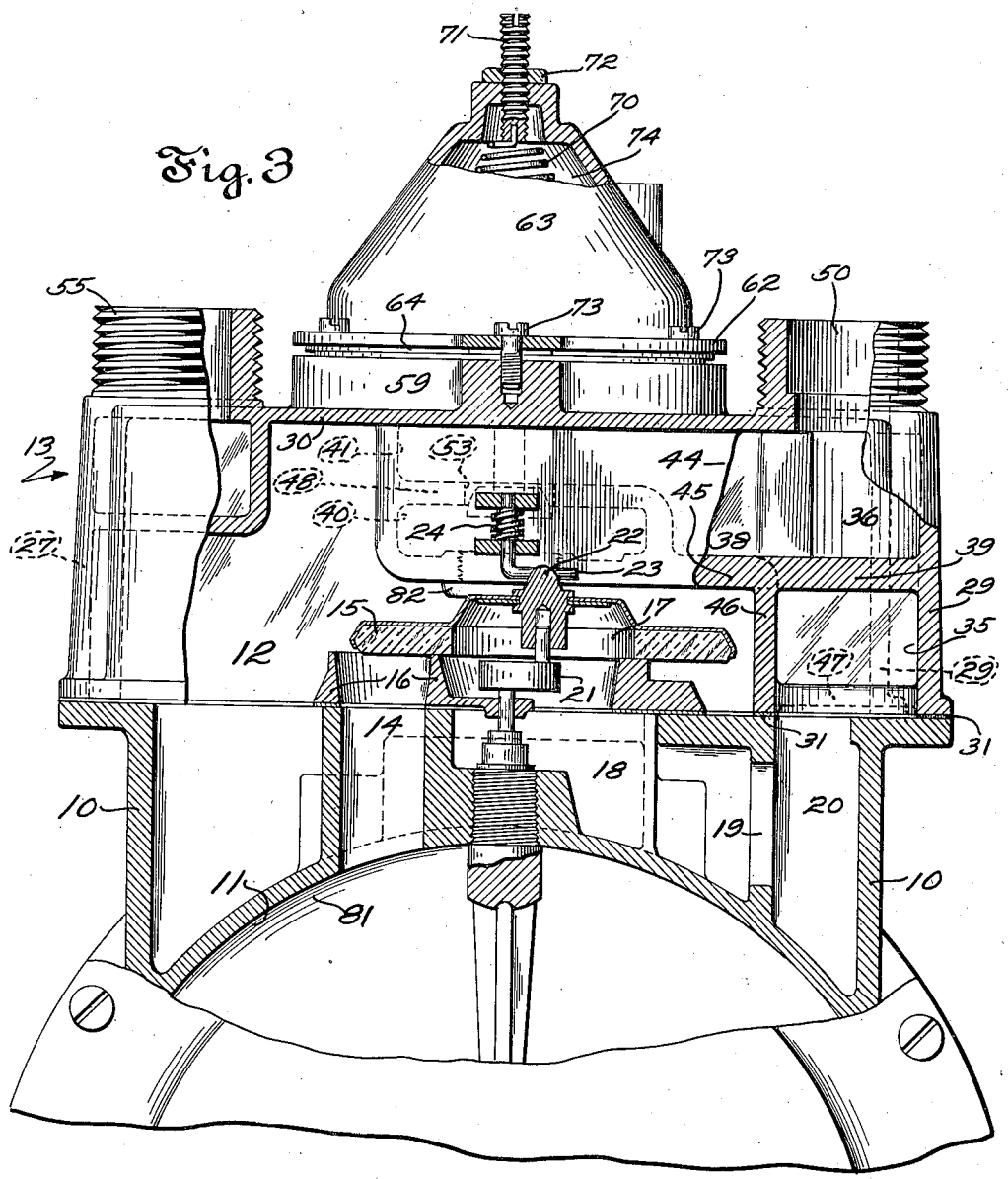

Sept. 9, 1941.   W. P. HUTCHINSON ET AL   2,255,219
METER HEAD INCORPORATING LOW-PRESSURE REGULATOR
Filed March 23, 1939   3 Sheets-Sheet 3

INVENTORS,
William P. Hutchinson,
Arthur S. McIntire,
By
ATTORNEY

Patented Sept. 9, 1941

2,255,219

UNITED STATES PATENT OFFICE 2,255,219

METER HEAD INCORPORATING LOW-PRESSURE REGULATOR

William P. Hutchinson and Arthur S. McIntire, Bridgeport, Conn., assignors to The Sprague Meter Company, Bridgeport, Conn., a corporation of Connecticut Application March 23, 1939, Serial No. 263,696

12 Claims. (Cl. 73—199)

This invention relates to gas meters structurally incorporating an automatic control of the type known as a low pressure regulator, some of whose functions have formerly been performed by a pipe connected unit or units located remotely from the structure of the gas meter and oftentimes close to the gas consuming appliance or appliances. One such function of the low pressure regulator is to react to variations in the pressure of gas received by it from the meter, however such variations may be occasioned, and automatically to maintain constant the pressure at which this same gas is finally delivered to the house lines or points of consumption. Variations in gas pressure may be due to several causes including changes in pressure in the service mains supplying low pressure gas to the meter.

The present improvements are directed particularly toward incorporating a low pressure regulator as part of the head structure of the Sprague type of gas meter so that gas discharged therefrom into the house lines will flow from the meter itself under a head of smooth and even pressure making unnecessary the installation of additional regulating devices between the meter and the points of gas consumption.

One object of the invention is to incorporate a low pressure regulator within the detachable Sprague meter head in a way to occasion the least possible alteration of its conventional make-up and exterior size and shape, as well as to preserve the standardized location and spacing of its means for pipe connection, so that meters equipped with the low pressure regulator may be installed interchangeably with meters not so equipped even in very restricted quarters where no provision was originally made for accommodating any larger structure than that of the plain Sprague meter alone.

Another object is to avoid in this type of meter head the use of leverage multiplying levers in the operating connections between the regulator diaphragm and the regulator valve.

A further object is to locate and arrange entirely within the so-called pressure chamber that is housed by the meter head and without enlarging the same, the passageways necessary to afford a circuitous route for gas exhausted from the measuring chambers of the meter before the gas shall be discharged from the meter head to the point of piping connection for the house lines.

A further object is to maintain the former or conventional location of the passageway end in the Sprague meter head which registers with the exhaust outlet of the underlying meter body, and also to maintain the former or conventional location of the discharge orifice through which gas is delivered from the meter head into the house pipe line and yet operatively interpose an automatic pressure regulating valve at a point in the meter head where it may control the pressure of gas flowing between such passageway end and such discharge orifice.

The foregoing and other objects in the present improvements will become clear from the following description of structure embodying one of the possible forms of the invention, in which description reference is had to the accompanying drawings, wherein:

Fig. 1 is a plan view of a Sprague type of meter equipped with a head unit incorporating a low pressure regulator and embodying the present improvements.

Fig. 2 is a rear view of the meter top showing thereabove the head structure and pressure regulator in section on the plane 2—2 in Fig. 1 looking in the direction of the arrows.

Fig. 3 is a front view of the combined meter body, superimposed head structure and regulator, showing most of the parts thereof in section on the planes 3—3—3 in Fig. 1, and is drawn on a larger scale than Fig. 1.

Figure 4:
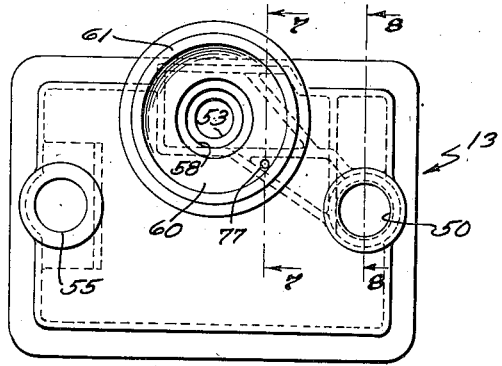
Fig. 4 is a plan view showing on a scale smaller than in Fig. 1, the meter head casting alone.
Figure 5:
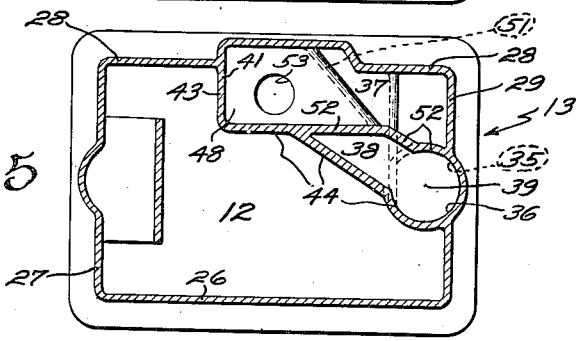
Fig. 5 is a plan view on the same scale as Fig. 4 showing the meter head casting in section on the plane 5—5 in Fig. 2.
Figure 6:
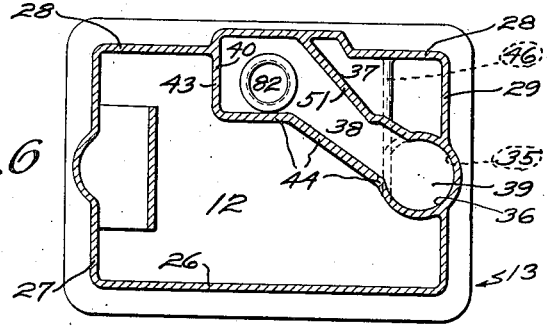
Fig. 6 is a plan view on the same scale as Fig. 4 showing the meter head casting in section on the plane 6—6 in Fig. 2.

The Sprague type of gas meter herein illustrated may consist of a hollow main body 10 constructed and housing gas metering chambers and apparatus of the general kind illustrated and described in U. S. Patent No. 722,390 granted March 10, 1903, to H. H. Sprague, or as illustrated and described in the co-pending application of Arthur S. McIntire, Serial No. 219,851, filed July 18, 1938. In these forms of the Sprague meter, the measuring chambers such as 11 in the main body 10 of the meter have communication with the pressure chamber 12 in the head unit casting 13 through throats such as 14 which are opened up or cut off in predetermined sequence and timed relationship by the movement of a centrally hollowed out valve disc 15 which rides in sliding contact with the smooth top edges of clover leaf partitions 16. By aid of its central hollow portion 17, this valve disc in its sliding movement also opens and closes communication between the said throats and a central well 18 which communicates through outlet 19 with the exhaust passageway 20. Valve disc 15 is moved by crank mechanism indicated generally at 21 and carries an upstanding projection 22 which impels the radial arm 23 of a register mechanism 24 occupying the pressure chamber 12 and which it will not be necessary herein to describe in greater detail. It will be observed that a sizeable amount of the available space in pressure chamber 12 is occupied by the oscillating valve disc 15 and the register mechanism 24 which it motivates. Gas from the supply lines is led into the pressure chamber 12 by the usual piping connection (not shown) to the threaded inlet boss 55. The head casting 13 is removably secured to the body of the meter by bolts 25 and a gas tight gasket 31 is employed to seal all joints between edges of the meter head and the meter body.

The importance of small size and compact proportion in gas meters which under modern conditions often must occupy very restricted quarters, gives rise to the problem of incorporating as fully as possible within the accustomed overall size and proportions of the meter head any pressure regulating apparatus to be built into the structure thereof. At the same time, certain interior operating parts of the meter, such as valve disc 15 and register mechanism 24, which already occupy a sizable amount of the space constituting the pressure chamber, must be permitted ample room to move for performing their usual functions.

In general the head casting 13 is made up of the roof wall 30 together with vertical side walls which depend from the edges of the roof wall and encompass the pressure chamber 12. These side walls may be termed the front wall 26, the left end wall 27, the rear wall 28 and the right end wall 29. The roof wall 30 as shown in Figs. 1 and 4 may be of rectangular areas. From this roof wall rises an externally threaded boss forming the gas outlet orifice 50 which is thus adapted for the connection of pipe for leading gas from the meter to the house lines. Orifice 50 is directly above vertically aligned ends 35 and 36 of two laterally extending passageways 37 and 38, respectively, which ends of said passageways are completely separated from each other by the horizontal cut-off partition wall 39, the passageway end 36 communicating with orifice 50 and and the passageway end 35 registering and communicating with the exhaust passageway 20 of the meter body. The upper passageway 37 extends alongside of and parallel with the rear wall 28 of the head casting and climbs from its lowest end 35 to an uppermost level just beneath the roof wall 30.

The passageway 38 extends diagonally crosswise the corner formed by the rear wall 28 and the right end wall 29 of the head casting, and is of maximum height at its end 36 which communicates with orifice 50 there also extending to the roof wall 30. But at its opposite or dead end 40, passageway 38 has only the reduced height shown in Fig. 2 whereat the dead end 41 of passageway 37 overlies the dead end 40 of passageway 38 and intervenes between it and the roof wall 30. Interior partition walls which may form integral portions of the head casting define the passageways 37 and 38 as follows.

A short vertical partition wall 43 depends from the roof wall 30 and joins with a somewhat jagged vertical partition wall 44 also depending from the roof wall and extending obliquely across a corner area of the meter head. Both of walls 43 and 44 join with an upper floor partition wall 45 which in turn joins with a depending partition wall 46 which in turn joins with a lower floor partition wall 47. Partition walls 43, 44, 45, 46 and 47 thus serve completely to separate each and both of the passageways 37 and 38 from the pressure chamber 12. The dead ends 40 and 41 of these two passageways are separated from each other by means of an intermediate horizontally extending partition wall 48 which turns downwardly to form the obliquely disposed edge partition wall 51 which joins the upper floor partition wall 45. For completing the isolation of passageways 37 and 38 from each other an additional web partition wall 52 of staggered disposition joins with partition walls 44, 45, 46 and 51.

The dead ends 40 and 41 of passageways 37 and 38 have controllable communication with each other through an orifice 53 in the intermediate horizontal partition wall 48, the edges of which orifice form a seat for a valve disc 56 carried on an upwardly extending valve stem 57. The valve stem 57 passes through a large circular hole 58 in the roof wall 30, around and concentric with which is built up an annular ridge which forms a shallow bowl-shaped compartment 60 and between whose top edges 61 and the flanges 62 of a hollow dome 63 is clamped the peripheral margin of a flexible diaphragm 64 whose central portion is penetrated by and made fast to the valve stem 57 because clamped between nuts 66 and 67 each having threaded engagement with valve stem 57. Between nuts 66 and 67 may be interposed weighted members such as the lower weight 68 and upper weight 69 cooperatively formed to present an annular seat for the spirally coiled compression spring 70 whose upper end is rotatably anchored in a socket in the bottom end of an adjustor screw 71 which has threaded engagement with a hole in the top of dome 63 and is held in adjusted position by a lock nut 72. Bolts 73 hold the dome 63 removably secured to the meter head. Dome 63 houses a chamber 74 kept at atmospheric pressure by the usual vent 75 which if desired may be threaded as shown to accommodate a dirt excluding plug or vent pipe (not shown).

Figure 7:
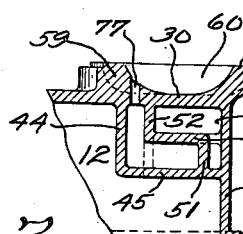
Fig. 7 is a fragmentary sectional view taken on the plane 7—7 in Fig. 4 looking in the direction of the arrows.
Figure 8:
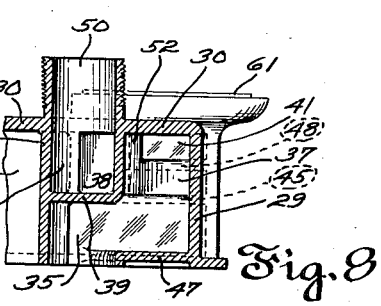
Fig. 8 is a fragmentary sectional view taken in section on the plane 8—8 in Fig. 4 looking in the direction of the arrows.

Also made fast to the valve stem 57 is the central portion of a smaller flexible diaphragm 78 which is clamped against the nut 67 by a bottom nut 79 also having threaded engagement with the valve stem. The peripheral margin of diaphragm 78 is fixedly clamped in a counterbore around the circular hole 58 by a retaining ring 80 which may be threaded into this counterbore. The larger diaphragm 64 isolates chamber 74 from fluid communication with compartment 60 while the smaller diaphragm 78 isolates compartment 60 from the dead end 41 of the passageway 37, but nevertheless fluid communication is constantly maintained between compartment 60 and said dead end 40 of passageway 38 by means of the breather hole 77 best shown in Figs. 4 and 7.

A drain plug 82 is removable from a threaded aperture in the upper floor partition wall 45 and thereby gives access to the screw driver slot 83 in the bottom of valve stem 57 to assist in adjusting the vertical spacing of the valve disc 56 from the diaphragms 64 and 78 and thereby the operative relationship of this valve disc to its seat. The valve disc 56 with its stem 57 may be removed downwardly through the threaded plug aperture and the valve seat refaced, if servicing becomes necessary.

In operation as a self contained gas meter and low pressure regulator, the apparatus hereinbefore described operates as follows:

When the meter is called upon for gas delivery by the opening, say, of some burner controlling valve in the house lines, lowering of pressure occurs in whichever measuring chambers are at that instant in communication with outlet passageway 20. Thus pressure differential on opposite sides of one or more motor diaphragms (such as 81) which separate the measuring chambers from one another causes such diaphragms to reciprocate. This action through linkage connections fully shown in the aforesaid patent or copending application, causes crank mechanism 21 to rotate and motivate the valve disc 15 and thereby the arm 23 of the register mechanism. Intermingling streams of gas are successively discharged from the measuring chambers through the throats 14, the disc hollow 17, the clover leaf shaped exhaust well 18, the well outlet 19 and exhaust passageway 20 of the meter body thence into the end 35 of the lateral passageway 37 in the head casting 13 and to the dead end 41 of the passageway 37.

From this point the outflowing gas must pass the regulator valve 53, 56, in order to enter the dead end 40 of passageway 38 through which the gas proceeds to the end 36 of the latter passageway and out of the head structure and into the house lines through the discharge orifice 50. If the pressure of gas tends to vary on the house line side of valve 53, 56, in passageway portion 38, corresponding change of pressure instantly will be imparted to the top surface of the smaller diaphragm 78 and in more forceful measure to the bottom surface of the larger diaphragm 64, through breather hole 77. Rising of gas pressure in passageway 38 will therefore immediately and proportionally to their exposed areas act on the diaphragms 64 and 78 to move the valve disc 56 upward toward its seat at 53. This checks further entrance of gas into chamber 38 until the pressure therein has become sufficiently reduced to permit weights 68 and 69 to again increase the opening of the regulator valve. Thus pressure in passageway 38 is kept constant even though the gas pressure in passageway 37 varies. Thus gas flows out of a meter incorporating our present improvements and into the house lines with a smooth and constant pressure making unnecessary the installation of extra pressure regulating devices in the house line or near the gas consuming appliances. It will further be noted that all structure which has been introduced for embodying these improvements occasions no material increase nor change in the usual overall size and proportions of the ordinary Sprague meter, nor change in the location of the points at which the gas exhausted from the measuring chambers of the meter enters and leaves the meter head structure.

The appended claims are directed to and are intended to cover all substitutes and equivalents for the particular structure and arrangement of the parts herein shown which would be suggested by the disclosure hereof or otherwise fairly come within their terms.

We claim:

1. The combination with a meter body containing gas measuring chambers, of a head unit detachably mounted on said body including head walls forming a hollow cap-like structure adapted for piping connection to a house line and partitioned in its interior to form a passageway leading from a point of communication with said measuring chambers to a point of connection to said house line, a modulating valve controlling the flow of gas through said passageway, and a plurality of spaced flexible diaphragms connected to operate said valve and arranged to be operably sensitive to pressure of gas contained in said passageway, one of said diaphragms having its opposite faces exposed to pressures of gas contained in respectively different portions of said passageway which are separated by said valve and the other of which diaphragms is exposed to pressure of gas which is on the house line side of said valve.

2. Head structure joined with the hollow body of a gas meter to form a common closure, embodying an integral hollow meter head casting having an orifice at a relatively high level therein for discharging gas from the interior of said head structure and a relatively low inlet directly underlying said orifice for admitting pulsating gas from the meter into said interior, said casting including partition walls dividing its said interior into at least two relatively isolated compartments, one of said compartments comprising a return-bent passageway having a first portion opening to the exterior of said casting through said relatively low inlet and having a second portion opening to the exterior of said casing through said relatively high orifice, said first portion of the passageway extending to a location overlying said second portion of the passageway, and a pressure regulating valve interposed between said portions of the passageway at said location.

3. A head unit for a gas meter embodying in combination, a hollow cap-like structure having a roof wall and side walls housing a gas pressure chamber and having an opening in said roof wall, a hollow dome mounted on said roof wall confining an atmospheric chamber above said opening, partition walls located within the confines of said side walls forming and closing off from said pressure chamber two horizontally extending overlapping passageways for gas exhausted from the meter, said passageways opening to the exterior of said cap-like structure at adjacently located ends, one of said partition walls separating opposite ends of said passageways from each other and containing an aperture providing communication therebetween, a diaphragm separating said atmospheric chamber from fluid communication with one of said passageways, and pressure regulating valve means operative in said aperture connected to be moved by said diaphragm.

4. Gas measuring and pressure regulating apparatus intimately associated in a unitary pipe line appliance embodying in combination, a meter case, expansible measuring chambers within said case for sequentially taking in and exhausting successive charges of gas, an outlet passageway within said case arranged to receive the charges of gas successively exhausted from said chambers, a modulating valve controlling the flow of gas through said outlet passage, and two diaphragms having respectively different size working areas connected to operate said valve coordinately, the smaller one of said diaphragms being arranged to be operably sensitive to pressure of gas contained in said passageway on its way from said measuring chambers to said valve, and the larger of said diaphragms being arranged to be operably sensitive to gas that has passed said valve.

5. Head structure for a gas meter, embodying an integral hollow casting having an orifice for discharging gas from the interior thereof and an inlet directly underlying said orifice for receiving pulsating gas from the meter into said interior, said casting including partition walls dividing its interior into at least two relatively isolated compartments, one of said compartments comprising a return-bend passageway having one horizontally extending portion opening out of said casting through said inlet and having another horizontally extending portion opening out of said casting through said orifice, and a valve interposed in and between said portions of the return bend passageway, together with a diaphragm operatively connected to said valve and operatively exposed to the pressure of gas in said passageway portion which opens through the said orifice for discharging gas.

6. The combination with the hollow body of a gas meter containing gas measuring chambers and having a horizontal wall topping the interior said meter body, of a valve operative to govern distribution of gas to said chambers movably carried by and above said wall substantially centrally of the width of said meter body, an outlet opening through said wall at one extreme side of said meter body for conducting upwardly charges of gas successively exhausted from said measuring chambers, a hollow meter head structure shaped and arranged to house a pressure chamber above said wall and containing said distributing valve, a passageway within said head structure isolated from said pressure chamber and leading from said body outlet to a location higher than said distributing valve centrally of said width of the meter body and leading thence to the exterior of said head structure at the said extreme side of the meter body, and a gas pressure regulating valve carried by said structure arranged to operate at said location in said passageway.

7. A gas pressure regulating head unit for attachment to the Sprague type of gas meter interchangeably with a standard non-regulating head unit therefor having a built-in vertical gas outlet passageway at one extreme side to afford room for the centrally located distributing valve of said Sprague meter, comprising a cap-like casting having a built-in vertically directed gas outlet passageway at one extreme side, a transverse web closing off direct communication between the bottom and top portions of said vertical passageway, partition walls forming a lateral extension of the bottom portion of said passageway dead-ended at a relatively high point in a central location crosswise said head unit, partition walls forming a lateral extension of the top portion of said vertical passageway dead-ended at a point directly under said bottom passageway extension in said location, and a pressure regulating valve controlling communication between said dead-ended extensions of said top and bottom portions of said passageway, together with gas pressure motivated means connected to operate said valve and carried centrally of the width of said cap-like casting above said regulating valve thereby to preserve room for said distributing valve of the Sprague meter in its unchanged central position.

8. A gas pressure regulating head unit as defined in claim 7 in which the said gas pressure motivated means includes a diaphragm sensitive to the pressure of gas in the said dead-ended extension of the said bottom passageway portion.

9. A gas pressure regulating head unit as defined in claim 7 in which the said gas pressure motivated means includes a diaphragm sensitive to the pressure of gas in the said dead-ended extension of the said top passageway portion.

10. A gas pressure regulating head unit as defined in claim 7 in which the said gas pressure motivated means includes a diaphragm sensitive to pressures in opposite directions thereupon respectively of gas in the said dead-ended extension of the said top passageway portion and of gas in the said dead-ended extension of the said bottom passageway portion.

11. A gas pressure regulating head unit as defined in claim 7 in which the said gas pressure motivated means include one diaphragm sensitive to the pressure of gas in the said dead-ended extension of the said top passageway portion and another diaphragm sensitive to pressures in opposite directions thereupon respectively of gas in the said dead-ended extension of the said top portion and of gas in the said dead-ended extension of said bottom passageway portion.

12. The combination defined in claim 6 in which the said meter head contains a corner space flanking the said distributing valve, and the said body outlet end of said passageway extends along and close to the outer side walls of said meter head while the remainder of said passageway extends obliquely across said corner space thereby to permit said passageway to double back upon itself as well as reverse the relationship of elevation of different portions of its full length.

WILLIAM P. HUTCHINSON.
ARTHUR S. McINTIRE.